US008526380B1

(12) United States Patent
Shah et al.

(10) Patent No.: US 8,526,380 B1
(45) Date of Patent: Sep. 3, 2013

(54) DYNAMIC TRANSMISSION MODE SELECTION BASED ON WIRELESS COMMUNICATION DEVICE DATA RATE CAPABILITIES

(75) Inventors: Maulik K. Shah, Overland Park, KS (US); Sachin R. Vargantwar, Overland Park, KS (US); Siddharth S. Oroskar, Overland Park, KS (US); Manoj Shetty, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 354 days.

(21) Appl. No.: 13/050,196

(22) Filed: Mar. 17, 2011

(51) Int. Cl.
*H04W 4/00* (2009.01)

(52) U.S. Cl.
USPC .................. 370/329; 455/450; 455/562.1

(58) Field of Classification Search
None
See application file for complete search history.

(56) References Cited

U.S. PATENT DOCUMENTS

| | | | |
|---|---|---|---|
| 6,930,981 B2 | 8/2005 | Gopalakrishnan et al. | |
| 7,020,482 B2 | 3/2006 | Medvedev et al. | |
| 7,076,263 B2 | 7/2006 | Medvedev et al. | |
| 7,221,956 B2 | 5/2007 | Medvedev et al. | |
| 7,239,886 B2 | 7/2007 | Gross et al. | |
| 8,396,157 B2 * | 3/2013 | Li et al. | 375/267 |
| 2002/0067701 A1 | 6/2002 | Chen et al. | |
| 2003/0139196 A1 | 7/2003 | Medvedev et al. | |
| 2003/0157954 A1 | 8/2003 | Medvedev et al. | |
| 2004/0032910 A1 | 2/2004 | Horng et al. | |
| 2005/0130694 A1 | 6/2005 | Medvedev et al. | |
| 2006/0116155 A1 | 6/2006 | Medvedev et al. | |
| 2006/0262874 A1 | 11/2006 | Shan | |
| 2008/0056217 A1 * | 3/2008 | Hara et al. | 370/342 |
| 2008/0188192 A1 * | 8/2008 | Chae et al. | 455/129 |
| 2009/0034639 A1 * | 2/2009 | Hwang et al. | 375/260 |
| 2009/0040970 A1 * | 2/2009 | Ahmadi et al. | 370/329 |
| 2009/0215418 A1 * | 8/2009 | Thomas et al. | 455/231 |
| 2010/0056170 A1 | 3/2010 | Lindoff et al. | |

OTHER PUBLICATIONS

U.S. Appl. No. 13/035,778, filed Feb. 25, 2011.

* cited by examiner

*Primary Examiner* — Brian Roberts

(57) ABSTRACT

A communication system comprises a wireless access node having a plurality of ports and a control system. The wireless access node is configured to exchange wireless communications over the ports with wireless communication devices that are individually identified by device identifiers. The control system is configured to individually allocate the wireless communication devices into categories based on the device identifiers and determine one of the categories having a majority of the wireless communication devices. The control system is configured to configure the ports of the wireless access node to utilize a MIMO 2T2R mode for exchanging the wireless communications if the one category having the majority of the wireless communication devices comprises a first data rate capability, and to configure the ports of the wireless access node to utilize a MIMO 4T4R mode for exchanging the wireless communications if the one category having the majority of the wireless communication devices comprises a second data rate capability.

20 Claims, 7 Drawing Sheets

| FREQUENCY | 1T2R | 2T2R | 4T4R |
|---|---|---|---|
| 10 MHz | 37 Mbit/s | 73 Mbit/s | 147 Mbit/s |

TRANSMIT MODE DOWNLINK PEAK RATES TABLE 400

| UE CATEGORY | PEAK RATE |
|---|---|
| 1 | 10 Mbit/s |
| 2 | 50 Mbit/s |
| 3 | 100 Mbit/s |
| 4 | 150 Mbit/s |
| 5 | 300 Mbit/s |

UE CATEOGRY DOWNLINK PEAK RATES TABLE 450

DYNAMIC TRANSMISSION MODE SELECTION BASED ON WIRELESS COMMUNICATION DEVICE DATA RATE CAPABILITIES

TECHNICAL BACKGROUND

Modern wireless communication protocols may use multiple-input and multiple-output (MIMO) transmission schemes when transferring communications to wireless communication devices. MIMO uses multiple antennas for each carrier in a wireless access node in order to improve communication transfer performance. The improvements in communication transfer performance may include increased wireless range and data throughput. Some examples of MIMO wireless protocols include Worldwide Interoperability for Microwave Access (WiMAX), Long Term Evolution (LTE), and the latest 802.11n wireless protocols (Wi-Fi).

In some cases, a wireless access node may use various transmit and receive diversity configurations by varying the number of antennas and carriers utilized by the wireless access node in order to either increase capacity or increase data throughput. For example, a wireless access node may utilize all of its antennas with a single carrier to maximize data transmission rates. Alternatively, the wireless access node may split the antennas among two carriers in order to increase capacity at the expense of data throughput. In this second arrangement, the wireless access node transmits communications to one set of wireless communication devices using one carrier while simultaneously transmitting communications to another set of devices using another carrier. However, data transmission rates are typically lower in this second arrangement because fewer antennas are used for transmitting communications to each of the wireless communication devices.

OVERVIEW

A method of operating a communication system is disclosed. The method comprises, in a wireless access node having a plurality of ports, exchanging wireless communications over the ports with a plurality of wireless communication devices that are individually identified by device identifiers. The method further comprises, in a control system, individually allocating the wireless communication devices into a plurality of categories based on the device identifiers and determining one of the categories having a majority of the wireless communication devices. The method further comprises, in the control system, configuring the ports of the wireless access node to utilize a multiple-input and multiple-output two transmit and two receive mode for exchanging the wireless communications if the one category having the majority of the wireless communication devices comprises a first data rate capability. The method further comprises, in the control system, configuring the ports of the wireless access node to utilize a multiple-input and multiple-output four transmit and four receive mode for exchanging the wireless communications if the one category having the majority of the wireless communication devices comprises a second data rate capability. The method further comprises, in the wireless access node, exchanging additional wireless communications over the ports with the wireless communication devices using the port configuration.

A communication system comprises a wireless access node having a plurality of ports and a control system. The wireless access node is configured to exchange wireless communications over the ports with a plurality of wireless communication devices that are individually identified by device identifiers. The control system is configured to individually allocate the wireless communication devices into a plurality of categories based on the device identifiers and determine one of the categories having a majority of the wireless communication devices. The control system is further configured to configure the ports of the wireless access node to utilize a multiple-input and multiple-output two transmit and two receive mode for exchanging the wireless communications if the one category having the majority of the wireless communication devices comprises a first data rate capability. The control system is further configured to configure the ports of the wireless access node to utilize a multiple-input and multiple-output four transmit and four receive mode for exchanging the wireless communications if the one category having the majority of the wireless communication devices comprises a second data rate capability. The wireless access node is further configured to exchange additional wireless communications over the ports with the wireless communication devices using the port configuration.

A wireless access node comprises a plurality of ports, a wireless communication transceiver, and a processing system. The wireless communication transceiver is configured to exchange wireless communications over the ports with a plurality of wireless communication devices that are individually identified by device identifiers. The processing system is configured to individually allocate the wireless communication devices into a plurality of categories based on the device identifiers and determine one of the categories having a majority of the wireless communication devices. The processing system is further configured to configure the ports of the wireless access node to utilize a multiple-input and multiple-output two transmit and two receive mode to exchange the wireless communications if the one category having the majority of the wireless communication devices comprises a first data rate capability. The processing system is further configured to configure the ports of the wireless access node to utilize a multiple-input and multiple-output four transmit and four receive mode to exchange the wireless communications if the one category having the majority of the wireless communication devices comprises a second data rate capability. The wireless communication transceiver is further configured to exchange additional wireless communications over the ports with the wireless communication devices using the port configuration.

BRIEF DESCRIPTION OF THE DRAWINGS

FIG. 4 is a block diagram that illustrates a transmit mode downlink peak rates table and a user equipment downlink peak rates table in an exemplary embodiment.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
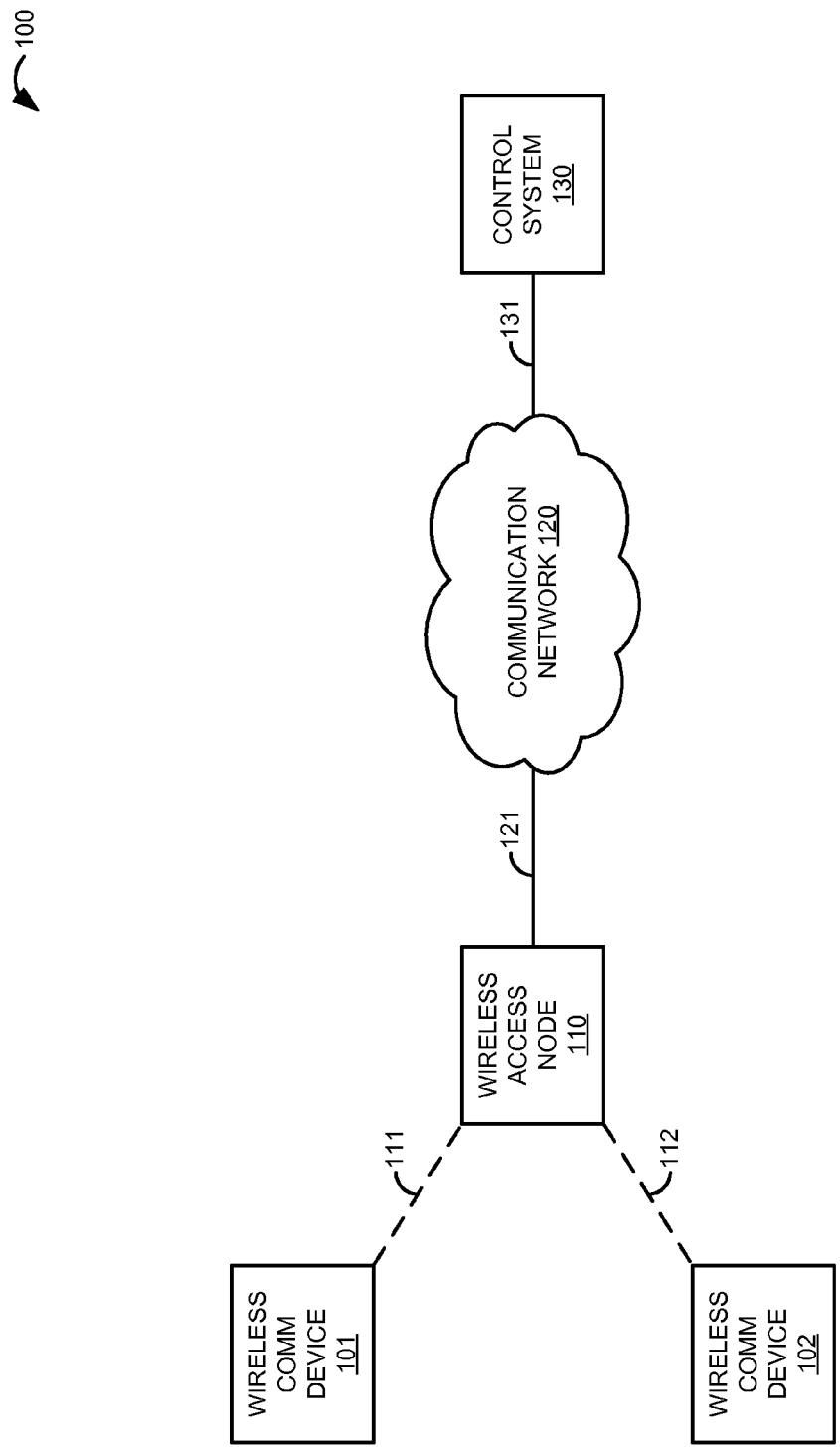
FIG. 1 is a block diagram that illustrates a communication system.

FIG. 1 is a block diagram that illustrates communication system 100. Communication system 100 includes wireless communication devices 101 and 102, wireless access node 110, communication network 120, and control system 130. Wireless communication device 101 and wireless access node 110 are in communication over wireless communication link 111. Likewise, wireless communication device 102 and wireless access node 110 communicate over wireless communication link 112. Wireless access node 110 and communication network 120 are in communication over communication link 121. Communication network 120 and control system 130 communicate over communication link 131.

Figure 2:
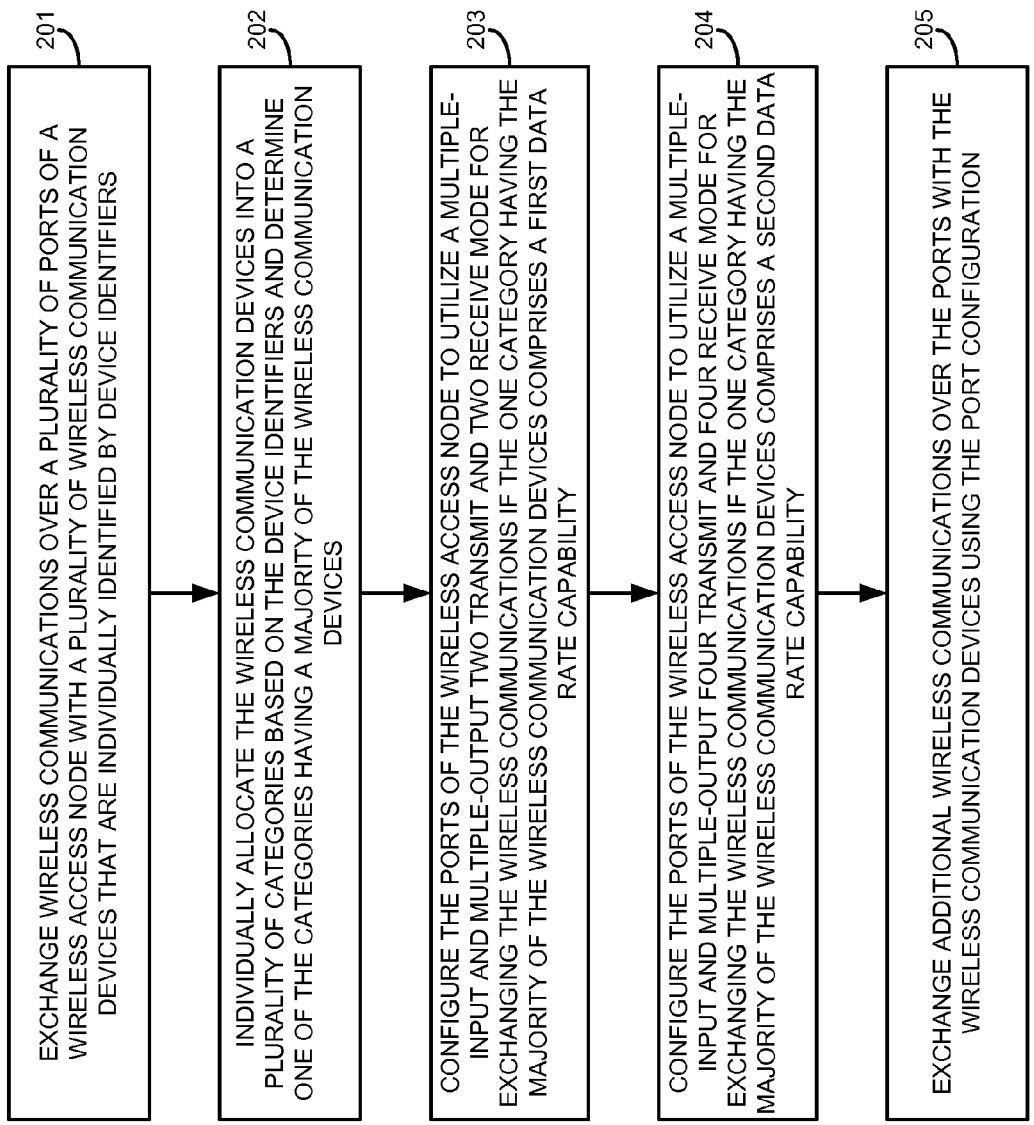
FIG. 2 is a flow diagram that illustrates an operation of the communication system.

FIG. 2 is a flow diagram that illustrates an operation of communication system 100. The steps of the operation are indicated below parenthetically.

In FIG. 2, wireless access node 110 exchanges wireless communications over a plurality of ports with wireless communication devices 101 and 102 (201). Each of the ports typically comprises an operative coupling between an amplifier and an antenna in wireless access node 110. Wireless access node 110 utilizes a multiple-input and multiple-output (MIMO) communication transmission protocol to exchange the wireless communications with wireless communication devices 101 and 102. Typically, wireless access node 110 utilizes various transmit and receive diversity configurations to achieve different peak data rates when communicating with wireless communication devices 101 and 102. The various transmit and receive modes utilize the plurality of ports of wireless access node 110 in different ways. For example, a MIMO two transmit and two receive (2T2R) mode might utilize two carriers with each carrier assigned to two of four ports to transmit communications to wireless communication devices 101 and 102, whereas a MIMO four transmit and four receive (4T4R) mode could use all four ports and a single carrier. Other examples of transmit and receive diversity configurations that wireless access node 110 may utilize include a one transmit and two receive (1T2R) mode, an eight transmit and eight receive (8T8R) mode, or any other possible configuration.

In operation, the 4T4R mode typically allows for faster communication throughput to each wireless communication device 101 and 102 because four ports are utilized to transmit communications, resulting in a higher peak data rate on the forward link between wireless access node 110 and devices 101 and 102. Alternatively, the 2T2R mode typically allows for a greater number of wireless communication devices 101 and 102 to receive transmissions from wireless access node 110 than the 4T4R mode, albeit at lower peak data rates than 4T4R. This is because, in 2T2R mode, wireless access node 110 may transmit communications to at least one wireless communication device 101 on one carrier over two ports, while utilizing two other ports with a second carrier to transmit communications to at least a second wireless communication device 102, as opposed to all four of those ports being used to transmit communications on a single carrier as in 4T4R mode. As a result, communication throughput to each wireless communication device 101 and 102 is lower in 2T2R mode because only two ports are used for transmitting to the devices 101 and 102 rather than the four ports used in 4T4R mode.

Wireless communication devices 101 and 102 are individually identified by device identifiers (201). For example, a first device identifier of the device identifiers uniquely identifies wireless communication device 101 and/or a user of device 101, and a second unique identifier is associated with wireless communication device 102 and/or its user. In some examples, each device identifier could comprise a Media Access Control (MAC) address, Mobile Station International Subscriber Directory Number (MSISDN) or some other telephone number, Electronic Serial Number (ESN), Mobile Station Identifier (MSID), Mobile Identification Number (MIN), Mobile Equipment Identifier (MEID), International Mobile Equipment Identity (IMEI), International Mobile Subscriber Identity (IMSI), Media Access Control Identifier (MACID), User Identifier (UID), or some other unique identifier—including combinations thereof.

Control system 130 individually allocates wireless communication devices 101 and 102 into a plurality of categories based on the device identifiers and determines one of the categories having a majority of the wireless communication devices 101 and 102 (202). Control system 130 could allocate the wireless communication devices 101 and 102 into the categories by referring to a table or some other data structure that relates each device identifier to a device category. In some examples, the categories could comprise different data rate capabilities of wireless communication devices 101 and 102. For example, wireless communication device 101 could be associated with a first category that defines a particular peak forward link bandwidth rate of which device 101 is capable, and wireless communication device 102 could be categorized into a second category that defines a different maximum forward link bandwidth rate capability for device 102. In some instances, all of the wireless communication devices 101 and 102 that are exchanging wireless communications with wireless access node 110 could be allocated to the same category. Control system 130 could also allocate wireless communication devices 101 and 102 into the plurality of categories per serving sector of wireless access node 110 in some examples. Once wireless communication devices 101 and 102 are allocated to their respective categories, control system 130 could determine which one of the categories has a majority of the wireless communication devices 101 and 102 by summing the number of devices allocated to each of the categories and identifying the category having the greatest number of devices.

Control system 130 configures the ports of wireless access node 110 to utilize a multiple-input and multiple output (MIMO) two transmit and two receive (2T2R) mode for exchanging the wireless communications if the one category having the majority of the wireless communication devices 101 and 102 comprises a first data rate capability (203). In some examples, the first data rate capability could comprise a peak forward link bandwidth rate. Typically, the MIMO 2T2R mode utilizes two carriers, with one carrier utilizing a first set of two ports of wireless access node 110, and the other carrier utilizing a different set of two ports of node 110. The MIMO 2T2R mode is typically associated with a downlink peak data rate, or a maximum amount of data transfer bandwidth on the forward link between wireless access node 110 and wireless communication devices 101 and 102. In some examples, the first data rate capability of the category having the majority of the wireless communication devices 101 and 102 falls below a peak data rate of the MIMO 2T2R mode, and control system 130 configures the ports of wireless access node 110 to utilize the MIMO 2T2R mode based on the first data rate capability associated with the majority category.

Alternatively, control system 130 configures the ports of wireless access node 110 to utilize a multiple-input and multiple output (MIMO) four transmit and four receive (4T4R) mode for exchanging the wireless communications if the one category having the majority of the wireless communication devices 101 and 102 comprises a second data rate capability (204). In some examples, the second data rate capability could comprise a peak forward link bandwidth rate. Typically, the MIMO 4T4R mode utilizes a single carrier that uses four ports of wireless access node 110 to transmit wireless communications to wireless communication devices 101 and 102. Like the 2T2R mode, the MIMO 4T4R mode is typically associated with a maximum rate of data bandwidth available on the forward link between wireless access node 110 and wireless communication devices 101 and 102. In some examples, the second data rate capability of the category having the majority of the wireless communication devices 101 and 102 falls below a peak data rate of the MIMO 4T4R mode but exceeds the peak data rate of the MIMO 2T2R mode. Thus, control system 130 could configure the ports of wireless access node 110 to utilize the MIMO 4T4R mode based on the second data rate capability associated with the category having the majority of the wireless communication devices 101 and 102.

In some examples, control system 130 could configure the ports of wireless access node 110 to utilize other transmit and receive diversity modes besides the 2T2R and 4T4R modes discussed above. For example, control system 130 could configure the ports of the wireless access node 110 to utilize a MIMO eight transmit and eight receive (8T8R) mode for exchanging the wireless communications if the one category having the majority of the wireless communication devices 101 and 102 comprises a third data rate capability.

In some cases, after allocating wireless communication devices 101 and 102 into the categories, control system 130 may determine that the same number of devices are allocated to two or more categories and that none of the categories have a majority of the wireless communication devices 101 and 102. In such an event, control system 130 may select a predetermined category from among the categories to represent the category having the majority of the wireless communication devices 101 and 102 for the purpose of determining the port configuration of wireless access node 110 as discussed above. Alternatively, the category selection could be determined dynamically. For example, control system 130 could determine a number of wireless communication devices 101 and 102 exchanging wireless communications with wireless access node 110, and configure the ports of wireless access node 110 to utilize the MIMO 2T2R mode for exchanging the wireless communications if the number of the wireless communication devices 101 and 102 exceeds a usage threshold.

Wireless access node 110 exchanges additional wireless communications over the ports with the wireless communication devices 101 and 102 using the port configuration (205). For example, if the port configuration of wireless access node 110 utilizes the 2T2R mode, wireless access node 110 could utilize one carrier and a first set of two ports to exchange the additional wireless communications with wireless communication device 101, and a second carrier with a different set of two ports to exchange wireless communications with wireless communication device 102. Alternatively, if control system 130 configures the ports of wireless access node 110 to utilize the 4T4R mode, wireless access node 110 would exchange the additional wireless communications with wireless communication devices 101 and 102 utilizing four ports and a single carrier.

Advantageously, by categorizing wireless communication devices 101 and 102 based on their peak data rate capabilities and then determining a device category having a majority of the devices 101 and 102, control system 130 can intelligently configure the ports of wireless access node 110 to utilize an optimal transmit and receive diversity mode for exchanging wireless communications with devices 101 and 102. Control system 130 is thus able to better match the transmit and receive mode of wireless access node 110 to the peak data rate capability of the majority of the wireless communication devices 101 and 102 served by wireless access node 110. In this manner, greater efficiency is achieved through optimal system performance and resource usage, thereby improving the user experience.

Referring back to FIG. 1, wireless communication devices 101 and 102 individually comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication devices 101 and 102 may also include a user interface, memory system, software, processing circuitry, or some other communication components. For example, wireless communication devices 101 and 102 could each comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101 and 102 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication devices 101-102 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others— including combinations thereof. Wireless network protocols that may be utilized by wireless access node 110 include CDMA, GSM, UMTS, HSPA, EV-DO, EV-DO rev. A, B, and C, 3GPP LTE, WiMAX, Wi-Fi, Bluetooth, Internet, telephony, or some other communication format—including combinations thereof.

Communication network 120 comprises the core network of a wireless communication service provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 120 may be configured to communicate over metallic, wireless, or optical links—including combinations thereof. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Control system 130 comprises a processing system and communication transceiver. Control system 130 may also include other components such as a router, server, data storage system, and power supply. Control system 130 may reside in a single device or may be distributed across multiple devices. Control system 130 may be a discrete system or may be integrated within other systems—including other systems within communication system 100. For example, although control system 130 is shown external to wireless access node 110 in FIG. 1, in some examples control system 130 could be included within the equipment comprising wireless access node 110. In some examples, control system 130 could comprise a network switch, mobile switching center, router, switching system, packet gateway, network gateway system, Internet access node, application server, service node, firewall, or some other communication system—including combinations thereof.

Wireless communication links 111 and 112 use the air or space as the transport medium. Wireless communication links 111 and 112 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other communication format—including combinations thereof. Wireless communication links 111 and 112 may individually comprise many different signals sharing the same link. For example, wireless communication links 111 and 112 could include multiple signals operating in a single propagation path comprising multiple communication sessions, frequencies, timeslots, transportation ports, logical transportation links, network sockets, IP sockets, packets, or communication directions—including combinations thereof.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 may be direct links or could include intermediate networks, systems, or devices.

Figure 3:
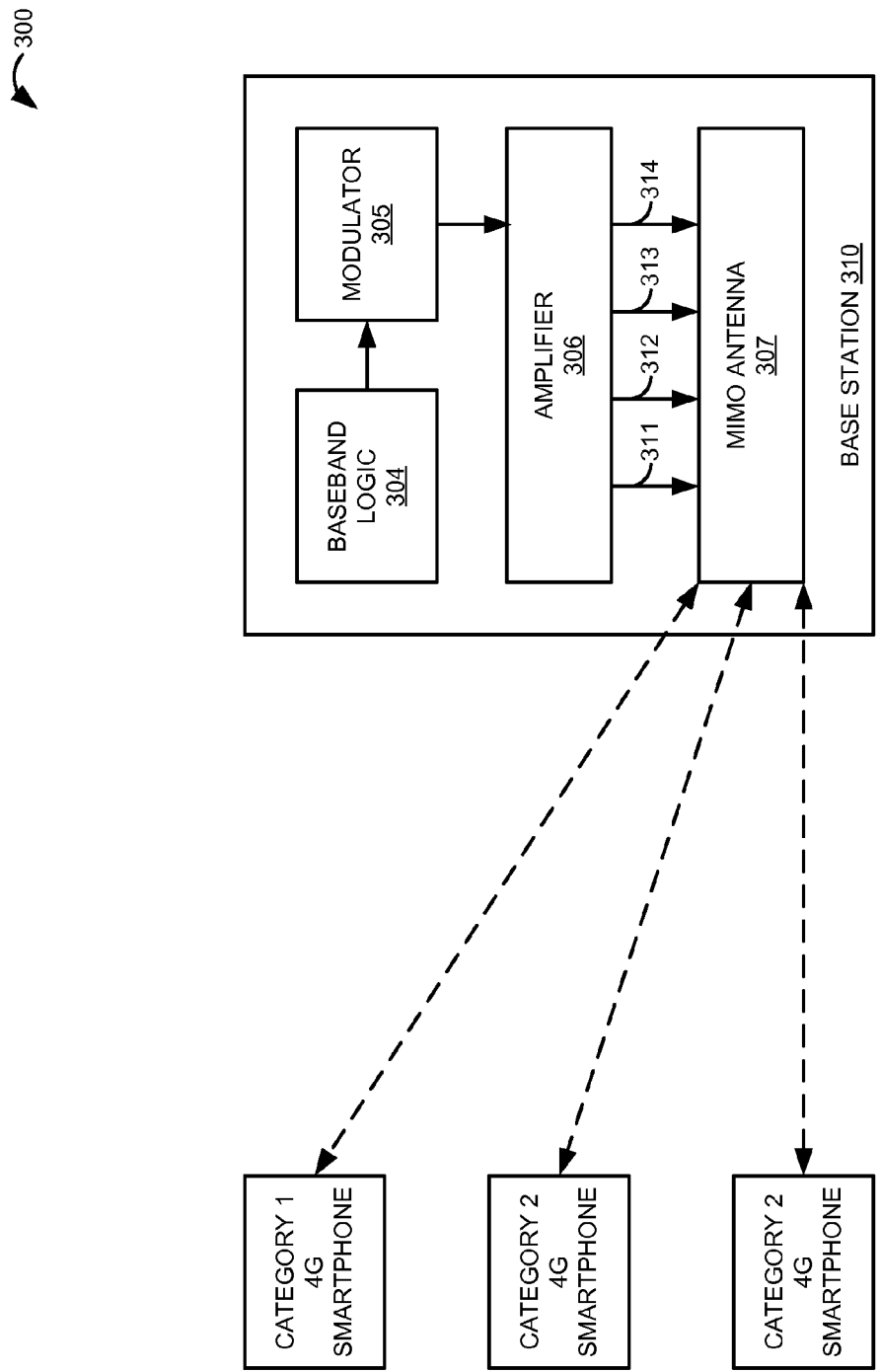
FIG. 3 is a block diagram that illustrates a communication system in an exemplary embodiment.

FIG. 3 is a block diagram that illustrates communication system 300. Communication system 300 includes base station 310. Base station 310 provides an example of wireless access node 110, although node 110 may use alternative configurations. Base station 310 comprises baseband logic 304, modulator 305, amplifier 306, and MIMO antenna 307. Amplifier 306 and MIMO antenna 307 are coupled together by ports 311-314. In this example, base station 310 comprises a WiMAX base station that could be part of an access service network. Communication system 300 also includes three 4G smartphones. One of the smartphones belongs to a category of type one and the other two smartphones are of a type two category. The 4G smartphones communicate wirelessly with MIMO antenna 307 of base station 310.

In operation, base station 310 receives communications for the smartphones over a backhaul link connected a communication network. Baseband logic 304 transfers the received communications to modulator 305, which modulates the communications for each smartphone using a MIMO protocol for base station 310. The MIMO protocol could be selected for base station 310 by a base station controller or some other control logic that is either included within base station 310 or in communication with base station 310. Various transmit and receive diversity configurations are provided by different MIMO protocol selections. In this example, base station 310 is capable of transmitting communications on the forward link between MIMO antenna 307 and the smartphones at peak rates of 7 megabits per second (Mbit/s) in a 1T2R mode, 15 Mbit/s in a 2T2R mode, and 30 Mbit/s in a 4T4R mode. The controller could select the transmit and receive diversity mode based on the data rate capabilities of the smartphones presently served by base station 310.

To determine the data rate capabilities of the smartphones, the controller could query a database that relates device identifiers to data rate categories for the smartphones. In this example, based on the MEID or MSID of each of the smartphones, the controller determines that one smartphone belongs to a category of type one having a downlink peak rate of 5 Mbit/s, and the other two smartphones are of category two having a 10 Mbit/s peak rate capability. Since the majority of the smartphones served by base station 310 belong to category two, the controller would select a transmit and receive diversity configuration for base station 310 based on the 10 Mbit/s downlink peak rate capability for category two. In this example, since the 1T2R mode only provides a downlink peak rate of 7 Mbit/s, the majority of the smartphones would be underserved by this mode, since they are capable of downlink peak rates of 10 Mbit/s according to their category two allocation. Thus, the 2T2R mode will be selected in this example, which can provide 15 Mbit/s peak data rates on the forward link, thereby ensuring that the category two smartphone majority will receive the full 10 Mbit/s downlink data rate of which they are capable.

Therefore, in this example, after the controller selects the 2T2R mode for base station 310, the controller instructs modulator 305 to modulate the communications for the smartphones using the 2T2R mode. The 2T2R mode enables transmission of the communications directed to the smartphones using one of two carriers, with one carrier utilizing ports 311 and 312, and the other carrier utilizing ports 313 and 314. As the communications are modulated, modulator 305 transfers the communications to amplifier 306. Amplifier 306 then amplifies the modulated communications and transfers the amplified communications to MIMO antenna 307 over ports 311-312 using one carrier and over ports 313-314 using another carrier. MIMO antenna 307 then wirelessly transmits the communications to the smartphones over wireless communication links. In this manner, the category two smartphones can optimally receive the communications from base station 310 at their peak downlink data rate of 10 Mbit/s, thereby improving the user experience, system performance, and efficiency.

FIG. 4 is a block diagram that illustrates transmit mode downlink peak rates table 400 and user equipment downlink peak rates table 450 in an exemplary embodiment. The information shown in tables 400 and 450 represent exemplary downlink peak data rates for an eNodeB and various user equipment categories, respectively, in an LTE communication system.

In this example, transmit mode downlink peak rates table 400 comprises a table in a network database, although other data formats and structures could be used. Table 400 includes columns labeled FREQUENCY, 1T2R, 2T2R, and 4T4R. As shown in table 400, the transmit modes of the LTE communication system communicate over a ten megahertz (10 MHz) frequency in this example. The 1T2R transmit and receive diversity mode has a downlink peak rate of 37 Mbit/s, the 2T2R mode has a downlink peak rate of 73 Mbit/s, and the 4T4R mode has a downlink peak rate of 147 Mbit/s.

The user equipment (UE) downlink peaks rates table 450 includes columns labeled UE CATEGORY and PEAK RATE. Each of the different UE categories is associated with a different downlink peak data rate, which represents the maximum rate that data may be transferred from an eNodeB to a UE belonging to a respective UE category on the forward link connection. As shown in table 450, UE category 1 has a peak downlink data rate of 10 Mbit/s, UE category 2 has a 50 Mbit/s peak rate, UE category 3 has a 100 Mbit/s peak rate, UE category 4 has a peak rate of 150 Mbit/s, and UE category 5 has a peak data rate of 300 Mbit/s. The information shown in tables 400 and 450 will now be discussed with respect to LTE communication system 500 of FIG. 5.

Figure 5:
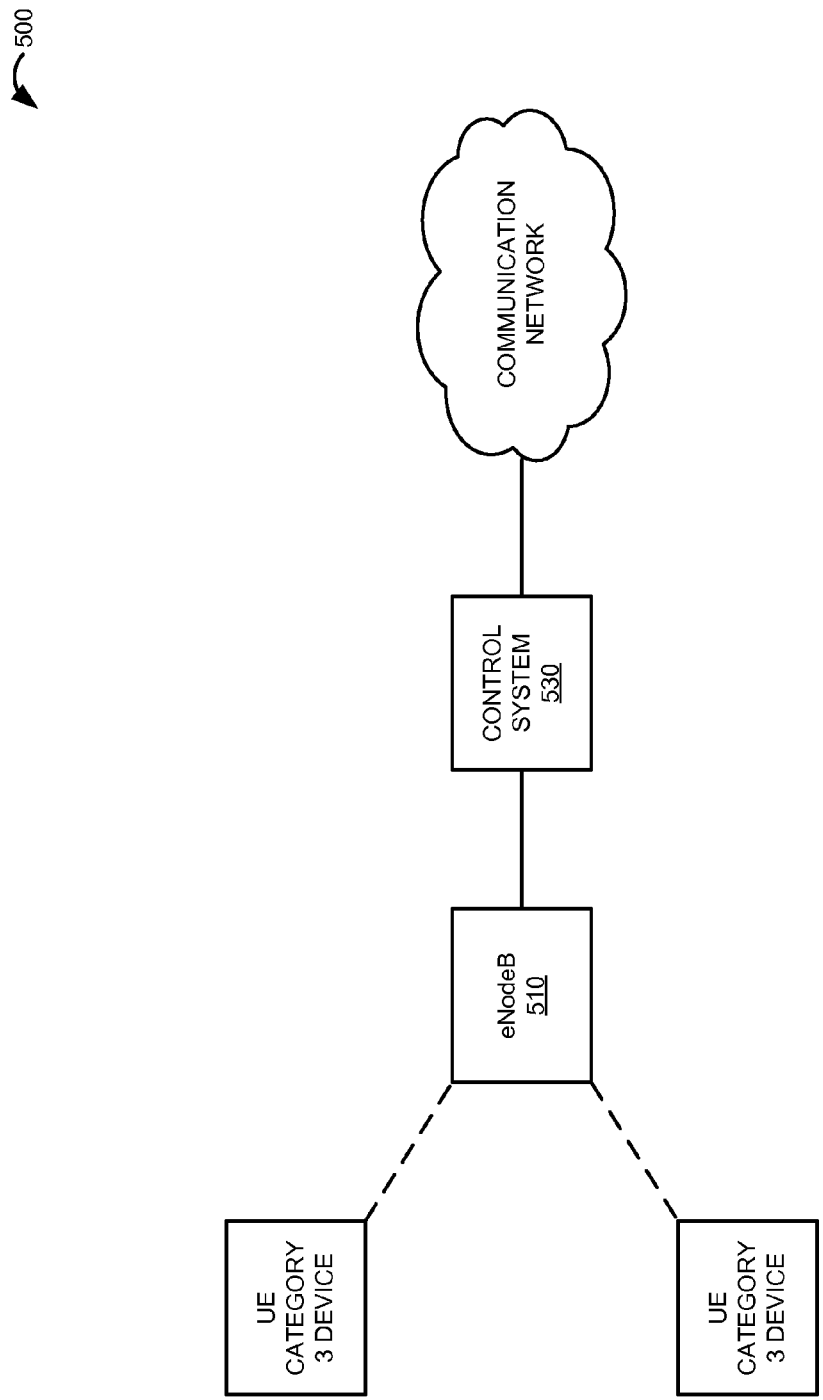
FIG. 5 is a block diagram that illustrates a long term evolution communication system in an exemplary embodiment.

FIG. 5 is a block diagram that illustrates long term evolution (LTE) communication system 500 in an exemplary embodiment. LTE communication system 500 includes enhanced Node B (eNodeB) 510 and control system 530. Control system 530 provides an example of control system 130 and eNodeB 510 provides an example of wireless access node 110, although system 130 and node 110 may use alternative configurations. LTE communication system 500 also includes two user equipment (UE) devices belonging to UE category 3 that are in the same sector served by eNodeB 510. As shown in UE category downlink peak rates table 450 in FIG. 4, the UE category 3 designation indicates that the two UE devices presently served by eNodeB 510 are capable of a downlink peak data rate of 100 Mbit/s.

In operation, control system 530 is responsible for selecting a transmit diversity mode for eNodeB 510 that provides optimal data transmission speeds for the UE devices served by eNodeB 510. Control system 530 therefore determines the UE category allocations for the UE devices in the sector. Based on the IMSI of each of the UE devices, control system 530 queries a network database or some other back-office system connected to the communication network that provides a UE category for each of the IMSI values. In this example, both of the UE devices in the sector belong to the UE category 3, which therefore have a downlink peak data rate of 100 Mbit/s based on table 450 of FIG. 4.

Control system 350 then selects a transmit diversity mode for eNodeB 510 based on the majority of UE devices in the sector having a UE category of 3. Since the 2T2R mode only provides a 73 Mbit/s data transmission rate, the UE category 3 devices would not achieve their 100 Mbit/s peak data rate capacity if eNodeB 510 utilized the 2T2R mode. Thus, control system 350 selects the 4T4R mode for eNodeB 510, thereby providing a 147 Mbit/s downlink peak rate by utilizing four ports and a single carrier. The UE devices of category 3 would therefore receive data transmissions from eNodeB 510 at their peak data rate capability of 100 Mbit/s. If at a later point in time additional UE devices belonging to category 2 entered the sector and shifted the majority count of the UE devices to category 2, then control system 350 could select the 2T2R mode for eNodeB 510 to free up additional ports and increase capacity to better serve the additional users at a peak data transmission rate of 73 Mbit/s. Thus, by intelligently monitoring the UE device categories of the UE devices per sector of eNodeB 510, control system 530 can better utilize system resources and serve a majority of the UE devices at their peak data transmission rates when appropriate.

Figure 6:
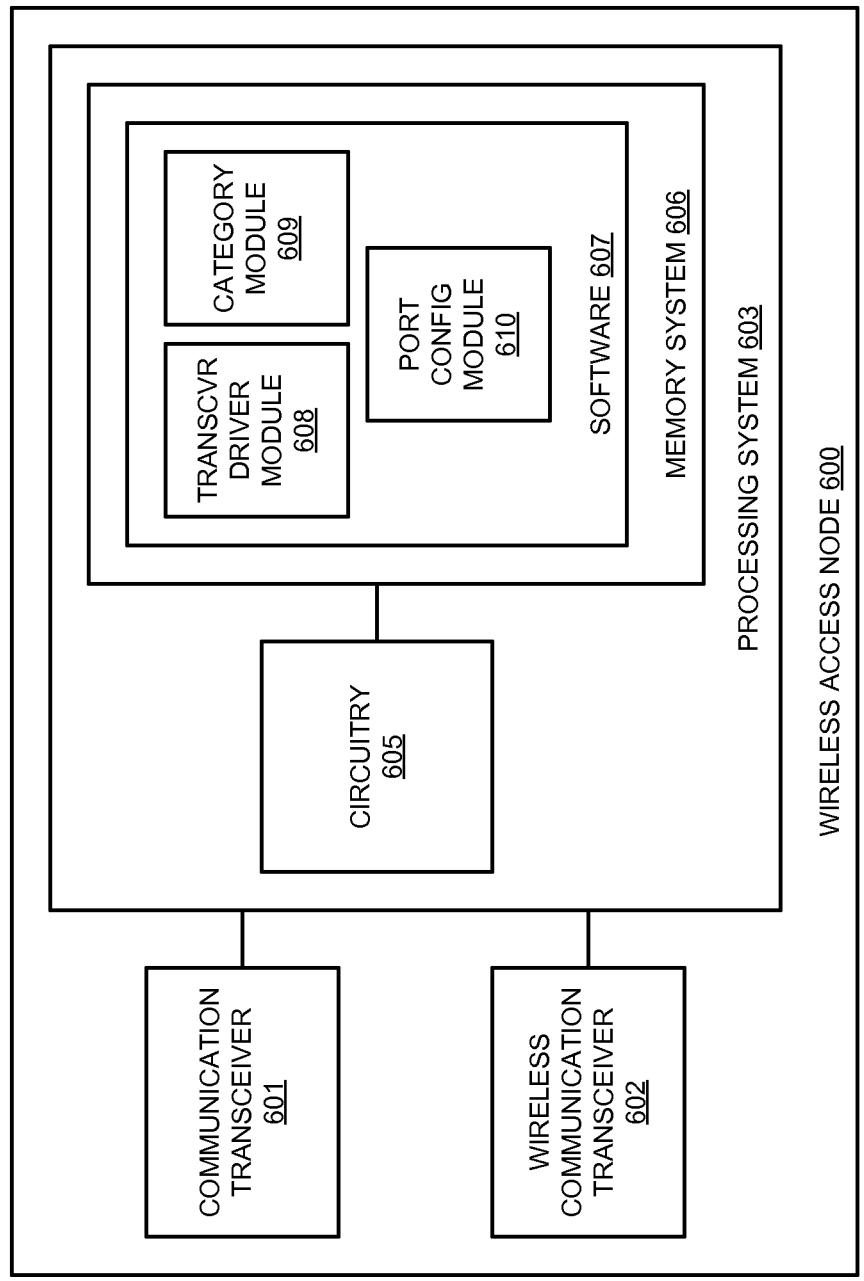
FIG. 6 is a block diagram that illustrates a wireless access node.

FIG. 6 is a block diagram that illustrates wireless access node 600. Wireless access node 600 provides an example of wireless access node 110, although node 110 may use alternative configurations. Wireless access node 600 comprises communication transceiver 601, wireless communication transceiver 602, and processing system 603. Processing system 603 is linked to communication transceiver 601 and wireless communication transceiver 602. Processing system 603 includes processing circuitry 605 and memory system 606 that stores operating software 607. Operating software 607 comprises software modules 608-610.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof.

Wireless communication transceiver 602 comprises RF communication circuitry and an antenna. The RF communication circuitry typically includes an amplifier, filter, RF modulator, and signal processing circuitry. Wireless communication transceiver 602 may also include a memory system, software, processing circuitry, or some other communication device. Wireless communication transceiver 602 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format. Wireless communication transceiver 602 is configured to exchange wireless communications over a plurality of ports with a plurality of wireless communication devices that are individually identified by device identifiers. Further, wireless communication transceiver 602 is configured to exchange additional wireless communications over the ports with the wireless communication devices using a port configuration.

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608-610, although software 607 could have alternative configurations in other examples.

When executed by circuitry 605, operating software 607 directs processing system 603 to operate as described herein for wireless access node 110. In particular, operating software 607 may direct processing system 603 to direct wireless communication transceiver 602 to exchange wireless communications over a plurality of ports with a plurality of wireless communication devices that are individually identified by device identifiers. Further, operating software 607 directs processing system 603 to individually allocate the wireless communication devices into a plurality of categories based on the device identifiers and determine one of the categories having a majority of the wireless communication devices. Operating software 607 directs processing system 603 to configure the ports of wireless access node 600 to utilize a multiple-input and multiple-output two transmit and two receive mode to exchange the wireless communications if the one category having the majority of the wireless communication devices comprises a first data rate capability. Operating software 607 directs processing system 603 to configure the ports of wireless access node 600 to utilize a multiple-input and multiple-output four transmit and four receive mode to exchange the wireless communications if the one category having the majority of the wireless communication devices comprises a second data rate capability. Finally, operating software 607 may direct processing system 603 to direct wireless communication transceiver 602 to exchange additional wireless communications over the ports with the wireless communication devices using the port configuration.

In this example, operating software 607 comprises a transceiver driver software module 608 that exchanges wireless communications over a plurality of ports with a plurality of wireless communication devices that are individually identified by device identifiers, and exchanges additional wireless communications over the ports with the wireless communication devices using a port configuration. Additionally, operating software 607 comprises a categorization software module 609 that individually allocates the wireless communication devices into a plurality of categories based on the device identifiers and determines one of the categories having a majority of the wireless communication devices. Operating software 607 also comprises a port configuration software module 610 that configures the ports of wireless access node 600 to utilize a multiple-input and multiple-output two transmit and two receive mode to exchange the wireless communications if the one category having the majority of the wireless communication devices comprises a first data rate capability, and configures the ports of wireless access node 600 to utilize a multiple-input and multiple-output four transmit and four receive mode to exchange the wireless communications if the one category having the majority of the wireless communication devices comprises a second data rate capability.

Figure 7:
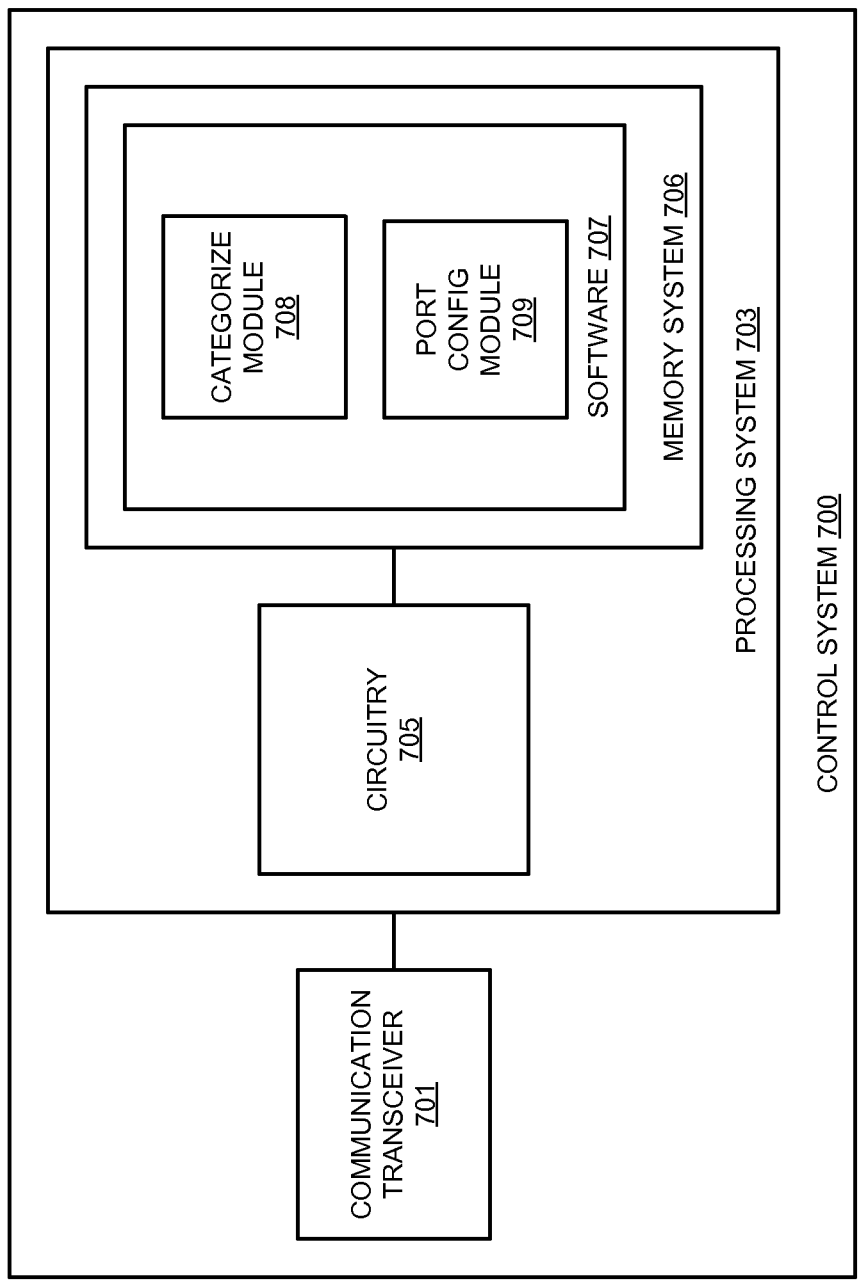
FIG. 7 is a block diagram that illustrates a control system.

FIG. 7 is a block diagram that illustrates control system 700. Control system 700 provides an example of control system 130, although system 130 may use alternative configurations. Control system 700 comprises communication transceiver 701 and processing system 703. Processing system 703 is linked to communication transceiver 701. Processing system 703 includes processing circuitry 705 and memory system 706 that stores operating software 707. Operating software 707 comprises software modules 708 and 709.

Communication transceiver 701 comprises components that communicate over communication links, such as network cards, ports, RF transceivers, processing circuitry and software, or some other communication components. Communication transceiver 701 may be configured to communicate over metallic, wireless, or optical links. Communication transceiver 701 may be configured to use TDM, IP, Ethernet, optical networking, wireless protocols, communication signaling, or some other communication format—including combinations thereof.

Processing circuitry 705 comprises microprocessor and other circuitry that retrieves and executes operating software 707 from memory system 706. Processing circuitry 705 may comprise a single device or could be distributed across multiple devices—including devices in different geographic areas. Processing circuitry 705 may be embedded in various types of equipment. Memory system 706 comprises a non-transitory computer readable storage medium, such as a disk drive, flash drive, data storage circuitry, or some other hardware memory apparatus. Memory system 706 may comprise a single device or could be distributed across multiple devices—including devices in different geographic areas. Memory system 706 may be embedded in various types of equipment. Operating software 707 comprises computer programs, firmware, or some other form of machine-readable processing instructions. Operating software 707 may include an operating system, utilities, drivers, network interfaces, applications, or some other type of software. In this example, operating software 707 comprises software modules 708 and 709, although software 707 could have alternative configurations in other examples.

When executed by circuitry 705, operating software 707 directs processing system 703 to operate as described herein for control system 130. In particular, operating software 707 directs processing system 703 to individually allocate wireless communication devices that are individually identified by device identifiers into a plurality of categories based on the device identifiers and determine one of the categories having a majority of the wireless communication devices. Further, operating software 707 directs processing system 703 to configure the ports of a wireless access node to utilize a multiple-input and multiple-output two transmit and two receive mode for exchanging wireless communications if the one category having the majority of the wireless communication devices comprises a first data rate capability. Similarly, operating software 707 directs processing system 703 to configure the ports of a wireless access node to utilize a multiple-input and multiple-output four transmit and four receive mode for exchanging wireless communications if the one category having the majority of the wireless communication devices comprises a second data rate capability.

In this example, operating software 707 comprises a categorization software module 708 that individually allocates wireless communication devices that are individually identified by device identifiers into a plurality of categories based on the device identifiers and determine one of the categories having a majority of the wireless communication devices. Operating software 707 also comprises a port configuration software module 709 that configures the ports of a wireless access node to utilize a multiple-input and multiple-output two transmit and two receive mode for exchanging wireless communications if the one category having the majority of the wireless communication devices comprises a first data rate capability, and configures the ports of a wireless access node to utilize a multiple-input and multiple-output four transmit and four receive mode for exchanging wireless communications if the one category having the majority of the wireless communication devices comprises a second data rate capability.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   in a wireless access node having a plurality of ports, exchanging wireless communications over the ports with a plurality of wireless communication devices that are individually identified by device identifiers;
   in a control system, individually allocating the wireless communication devices into a plurality of categories based on the device identifiers and determining one of the categories having a majority of the wireless communication devices;
   in the control system, configuring the ports of the wireless access node to utilize a multiple-input and multiple-output two transmit and two receive mode for exchanging the wireless communications if the one category having the majority of the wireless communication devices comprises a first data rate capability;
   in the control system, configuring the ports of the wireless access node to utilize a multiple-input and multiple-output four transmit and four receive mode for exchanging the wireless communications if the one category having the majority of the wireless communication devices comprises a second data rate capability; and
   in the wireless access node, exchanging additional wireless communications over the ports with the wireless communication devices using the port configuration.

2. The method of claim 1 wherein the first data rate capability and the second data rate capability comprise peak forward link bandwidth rates.

3. The method of claim 1 wherein the multiple-input and multiple-output two transmit and two receive mode utilizes two carriers and the multiple-input and multiple-output four transmit and four receive mode utilizes a single carrier.

4. The method of claim 1 wherein the first data rate capability falls below a peak data rate of the multiple-input and multiple-output two transmit and two receive mode.

5. The method of claim 4 wherein the second data rate capability falls below a peak data rate of the multiple-input and multiple-output four transmit and four receive mode but exceeds the peak data rate of the multiple-input and multiple-output two transmit and two receive mode.

6. The method of claim 1 further comprising, in the control system, configuring the ports of the wireless access node to utilize a multiple-input and multiple-output eight transmit and eight receive mode for exchanging the wireless communications if the one category having the majority of the wireless communication devices comprises a third data rate capability.

7. The method of claim 1 further comprising, in the control system, determining a number of the wireless communication devices exchanging the wireless communications with the wireless access node, and configuring the ports of the wireless access node to utilize a multiple-input and multiple-output two transmit and two receive mode for exchanging the wireless communications if the number of the wireless communication devices exceeds a usage threshold.

8. The method of claim 1 wherein each port of the ports of the wireless access node comprises a coupling between an amplifier and an antenna in the wireless access node.

9. The method of claim 1 wherein the additional wireless communications utilize a long term evolution wireless protocol.

10. The method of claim 1 wherein the additional wireless communications utilize a worldwide interoperability for microwave access wireless protocol.

11. A communication system comprising:
    a wireless access node having a plurality of ports;
    the wireless access node configured to exchange wireless communications over the ports with a plurality of wireless communication devices that are individually identified by device identifiers;
    a control system configured to individually allocate the wireless communication devices into a plurality of categories based on the device identifiers and determine one of the categories having a majority of the wireless communication devices;
    the control system configured to configure the ports of the wireless access node to utilize a multiple-input and multiple-output two transmit and two receive mode for exchanging the wireless communications if the one category having the majority of the wireless communication devices comprises a first data rate capability;
    the control system configured to configure the ports of the wireless access node to utilize a multiple-input and multiple-output four transmit and four receive mode for exchanging the wireless communications if the one category having the majority of the wireless communication devices comprises a second data rate capability; and
    the wireless access node configured to exchange additional wireless communications over the ports with the wireless communication devices using the port configuration.

12. The system of claim 11 wherein the first data rate capability and the second data rate capability comprise peak forward link bandwidth rates.

13. The system of claim 11 wherein the multiple-input and multiple-output two transmit and two receive mode utilizes two carriers and the multiple-input and multiple-output four transmit and four receive mode utilizes a single carrier.

14. The system of claim 11 wherein the first data rate capability falls below a peak data rate of the multiple-input and multiple-output two transmit and two receive mode.

15. The system of claim 14 wherein the second data rate capability falls below a peak data rate of the multiple-input and multiple-output four transmit and four receive mode but exceeds the peak data rate of the multiple-input and multiple-output two transmit and two receive mode.

16. The system of claim 11 wherein the control system is configured to configure the ports of the wireless access node to utilize a multiple-input and multiple-output eight transmit and eight receive mode for exchanging the wireless communications if the one category having the majority of the wireless communication devices comprises a third data rate capability.

17. The system of claim 11 wherein the control system is configured to determine a number of the wireless communication devices exchanging the wireless communications with the wireless access node and to configure the ports of the wireless access node to utilize a multiple-input and multiple-output two transmit and two receive mode for exchanging the wireless communications if the number of the wireless communication devices exceeds a usage threshold.

18. The system of claim 11 wherein each port of the ports of the wireless access node comprises a coupling between an amplifier and an antenna in the wireless access node.

19. The system of claim 11 wherein the additional wireless communications utilize a long term evolution wireless protocol.

20. A wireless access node comprising:
- a plurality of ports;
- a wireless communication transceiver configured to exchange wireless communications over the ports with a plurality of wireless communication devices that are individually identified by device identifiers;
- a processing system configured to individually allocate the wireless communication devices into a plurality of categories based on the device identifiers and determine one of the categories having a majority of the wireless communication devices;
- the processing system configured to configure the ports of the wireless access node to utilize a multiple-input and multiple-output two transmit and two receive mode to exchange the wireless communications if the one category having the majority of the wireless communication devices comprises a first data rate capability;
- the processing system configured to configure the ports of the wireless access node to utilize a multiple-input and multiple-output four transmit and four receive mode to exchange the wireless communications if the one category having the majority of the wireless communication devices comprises a second data rate capability; and
- the wireless communication transceiver configured to exchange additional wireless communications over the ports with the wireless communication devices using the port configuration.

* * * * *